(12) United States Patent
Connell et al.

(10) Patent No.: US 7,843,377 B2
(45) Date of Patent: Nov. 30, 2010

(54) METHODS FOR TWO-DIMENSIONAL AUTOFOCUS IN HIGH RESOLUTION RADAR SYSTEMS

(75) Inventors: Scott D. Connell, Ann Arbor, MI (US); Edward F. Gabl, Saline, MI (US); Mark A. Ricoy, Ann Arbor, MI (US); Elizabeth T. Batteh, Ann Arbor, MI (US); Ron S. Goodman, Novi, MI (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 0 days.

(21) Appl. No.: 12/656,689

(22) Filed: Feb. 12, 2010

(65) Prior Publication Data
US 2010/0149024 A1    Jun. 17, 2010

Related U.S. Application Data

(62) Division of application No. 11/889,637, filed on Aug. 15, 2007, now Pat. No. 7,663,529.

(60) Provisional application No. 60/837,623, filed on Aug. 15, 2006.

(51) Int. Cl.
*G01S 13/00* (2006.01)
(52) U.S. Cl. .................. 342/25 F; 342/25 A; 342/25 B; 342/25 C; 342/25 D; 342/25 E; 342/25 R
(58) Field of Classification Search .............. 342/25 R, 342/25 A, 25 B, 25 C, 25 D, 25 E, 25 F, 175
See application file for complete search history.

(56) References Cited

U.S. PATENT DOCUMENTS 4,219,811 A * 8/1980 Herman et al. ............ 342/25 E

| 4,647,126 A | 3/1987 | Sobota, Jr. |
| 4,673,967 A | 6/1987 | Hingorany |

(Continued)

FOREIGN PATENT DOCUMENTS

JP          6126076        11/1986

(Continued)

OTHER PUBLICATIONS

"Eigenvector Method for Maximum-Likelihood Estimation of Phase Errors in Synthetic-Aperture-Radar Imagery," by Charles V. Jakowatz, Jr, et al, J.Opt. Soc. Am. A, vol. 10, No. 12, Dec. 1993, pp, 2539-2546.

(Continued)

*Primary Examiner*—Thomas H Tarcza
*Assistant Examiner*—Peter M Bythrow
(74) *Attorney, Agent, or Firm*—Steptoe & Johnson LLP

(57) ABSTRACT

Provided are two-dimensional autofocus methods in a synthetic aperture radar (SAR) system which include: (1) two-dimensional pulse pair product algorithm including shear PGA, eigenvector phase history ("EPH"), shear PGA/EPH; (2) two-dimensional optimization algorithms including parametric one-dimensional estimate/two-dimensional correction, parametric two dimensional estimate/two-dimensional correction, unconstrained two-dimensional nonparametric and constrained two-dimensional nonparametric methods; (3) a two-dimensional geometry filter algorithm; (4) a two-dimensional prominent point processing algorithm; (5) a one-dimensional phase estimate of higher order two dimensional phase errors; and, (6) a fast SHARP parametric autofocus algorithm.

10 Claims, 11 Drawing Sheets

U.S. PATENT DOCUMENTS

| | | | |
|---|---|---|---|
| 4,677,458 A | 6/1987 | Morris | |
| 4,728,751 A | 3/1988 | Canestaro et al. | |
| 4,827,611 A | 5/1989 | Pai et al. | |
| 4,924,229 A * | 5/1990 | Eichel et al. | 342/25 E |
| 4,999,635 A * | 3/1991 | Niho | 342/25 D |
| 5,043,734 A * | 8/1991 | Niho | 342/25 A |
| 5,184,134 A * | 2/1993 | Niho et al. | 342/25 D |
| 5,198,391 A | 3/1993 | Rosel et al. | |
| 5,200,754 A * | 4/1993 | Niho | 342/25 D |
| 5,248,976 A * | 9/1993 | Niho et al. | 342/25 A |
| 5,294,039 A | 3/1994 | Pai et al. | |
| 5,317,479 A | 5/1994 | Pai et al. | |
| 5,353,621 A | 10/1994 | Knecht et al. | |
| 5,517,590 A | 5/1996 | Auborn et al. | |
| 5,854,602 A * | 12/1998 | Stankwitz et al. | 342/25 F |
| 6,046,695 A * | 4/2000 | Poehler et al. | 342/25 A |
| 6,518,914 B1 * | 2/2003 | Peterson et al. | 342/25 R |
| 6,608,585 B2 * | 8/2003 | Benitz | 342/25 R |
| 6,661,369 B1 * | 12/2003 | Cho | 342/25 R |
| 6,670,907 B2 * | 12/2003 | Cho | 342/25 R |
| 6,677,885 B1 * | 1/2004 | Frankot | 342/25 R |
| 6,781,541 B1 * | 8/2004 | Cho | 342/25 D |
| 6,822,606 B2 | 11/2004 | Ponsford et al. | |
| 6,830,177 B2 | 12/2004 | Pai | |
| 6,873,285 B2 * | 3/2005 | Carrara et al. | 342/25 R |
| 6,919,839 B1 * | 7/2005 | Beadle et al. | 342/25 R |
| 6,943,724 B1 * | 9/2005 | Brace et al. | 342/25 B |
| 7,145,496 B2 * | 12/2006 | Cho et al. | 342/25 R |
| 7,145,498 B2 * | 12/2006 | Cho et al. | 342/25 R |
| 7,391,357 B1 * | 6/2008 | Doerry et al. | 342/25 F |
| 2004/0093364 A1 * | 5/2004 | Cheng et al. | 708/203 |
| 2004/0178951 A1 * | 9/2004 | Ponsford et al. | 342/192 |

FOREIGN PATENT DOCUMENTS

| | | |
|---|---|---|
| JP | 2004198275 | 7/2004 |

OTHER PUBLICATIONS

"Phase Gradient Autofocus—A Robust Tool for High Resolution SAR Phase Correction," by D. E. Wahl et al, IEEE Transactions of Aerospace and Electronic Systems, vol. 30, No. 3, Jul. 1994, pp. 827-835.

"Synthetic-Aperture Radar Autofocus by Maximizing Sharpness," by J. R. Fienup, Optics Letters, vol. 25, No. 4, Feb. 2000, Optical Society of America, pp. 221-223.

"Two-Dimensional Phase Gradient Autofocus," by D. Warner et al, Proceedings of SPIE vol. 4123 (2000), pp. 162-173.

"Spotlight Synthetic Aperture Radar Signal Processing Algorithms," W. Carrara et al, Artech House, Norwood, MA (1995), pp. 245-287.

"Phase Error Correction by Shear Averaging," , by J. Fienup, Signal Recovery and Synthesis II, Optical Society of America, (1989), pp. 134-137.

"Aberration Correction of Speckled Imagery With An Image-Sharpness Criterion," by R. Paxman et al, Statistical Optics, Proceedings of the SPIE, San Diego, CA, Aug. 1988.

"Nonlinear Apodization for Sidelobe Control in SAR Imagery," by H. Stankwitz et al, IEEE Transactions on Aerospace and Electronic Systems, vol. 31, No. 1, Jan. 1995, pp. 267-279.

"A Map Draft Autofocus Technique for Correcting Higher Order SAR Phase Errors," by Clanton E. Mancill and J. Morris Swigger, Hughes Aircraft Company, Radar Systems Group, El Segundo, Califomia,presented at the Tri-Services Radar Conference, Monterey, California (Jun. 23-25, 1981), pp. 391-398, plus 2 additional pages re drawings.

International Preliminary Report on Patentability, International Bureau of WIPO, Feb. 26, 2009.

* cited by examiner

φ(range, azimuth)

500

φ(range freq, azimuth angle)

550

METHODS FOR TWO-DIMENSIONAL AUTOFOCUS IN HIGH RESOLUTION RADAR SYSTEMS

This application is a divisional of U.S. patent application Ser. No. 11/889,637, filed Aug. 15, 2007 now U.S. Pat. No. 7,663,529, which claims priority to U.S. provisional patent application No. 60/837,623, filed Aug. 15, 2006, each of which is hereby incorporated by reference in its entirety for all purposes.

BACKGROUND OF THE INVENTION

1. Field of the Invention

The present invention relates to two-dimensional autofocus methods in a Synthetic Aperture Radar ("SAR") systems. More specifically, the present invention relates to two-dimensional autofocus methods which compensate both on and off-axis distortions in SAR signal history.

2. Discussion of Background Information

Synthetic aperture radar ("SAR") systems typically involve a single radar antenna mounted on a moving platform. Data is generally collected using an antenna having a relatively small aperture. Because the antenna is mounted on a moving platform, a series of recurring radar pulse returns from the same target may be received by the antenna at different spatial locations. These returns may then be synthesized during processing, thereby simulating the use of a much larger antenna aperture. As such, it is possible to create an image having a higher azimuth resolution than would be possible with the same antenna at a stationary position.

It is well known that phase errors often cause a SAR image to be out of focus. These phase errors may be the result of uncompensated motion between the SAR antenna and the scene being imaged, algorithm approximations, hardware limitations or propagation effects. Therefore, to improve image quality, it is desirable to remove, compensate for or correct for these phase errors.

Generally, one or more autofocus algorithms are used to remove or correct for these phase errors. The algorithms are typically computer-implemented estimations that are applied to the SAR signal history to remove or compensate for any degradation of the received signals. Previous systems have utilized autofocus methods such as mapdrift, pulse pair product (including phase gradient autofocus ("PGA"), shear PGA, eigenvector phase history and phase difference autofocus), contrast optimization and prominent point processing.

However, these previous methods are only capable of removing one-dimensional phase error. That is, only phase errors which appear as distortions of a target in the cardinal (i.e., range and azimuth) directions may be removed. While one-dimensional autofocus is sufficient for mid-resolution SAR systems where the dwell angle is relatively small, as the resolution of a SAR system increases, non-linear target distortions become more significant due to an increased dwell angle.

SUMMARY OF THE INVENTION

Exemplary embodiments of the present invention address the drawbacks noted above. By way of example and not by way of limitation, the exemplary embodiments of the present invention provides two-dimensional autofocus methods in a synthetic aperture radar (SAR) system which include: (1) two-dimensional pulse pair product algorithm including shear PGA, eigenvector phase history ("EPH"), shear PGA/ EPH); (2) two-dimensional optimization algorithms including parametric one-dimensional estimate/two-dimensional correction, parametric two dimensional estimate/two-dimensional correction, unconstrained two-dimensional nonparametric and constrained two-dimensional nonparametric methods; (3) a two-dimensional geometry filter algorithm; (4) a two-dimensional prominent point processing algorithm; (5) a one-dimensional phase estimate of higher order two dimensional phase errors; and, (6) a fast SHARP parametric autofocus algorithm.

Exemplary embodiments of the two-dimensional pulse pair product algorithm in a synthetic aperture radar (SAR) system for automatically compensating on-axis and off-axis distortions includes an image formation processor (IFP) configured to generate a complex image, a processor configured to remove the on-axis and off-axis distortions in the complex image based on a two-dimensional autofocus algorithm to generate a corrected image, a memory configured to store the algorithm and the corrected image and an output interface configured to output the corrected image to an external device. It is an aspect of the present invention that the complex image is defined in two-dimensions with range information in a vertical direction and azimuth information in a horizontal direction.

An exemplary embodiment of the two-dimensional pulse pair product algorithm provides for a method for automatically compensating on-axis and off-axis distortions in a synthetic aperture radar (SAR) image, the method including, creating a complex image based on information collected by a sensor, removing the on-axis and off-axis distortions in the complex image based on a two-dimensional autofocus algorithm, generating a corrected image, and outputting the corrected image to an external device. It is an aspect of the present invention that the complex image is defined in two-dimensions with range information in a vertical direction and azimuth dispersed phase history information in a horizontal direction.

An exemplary embodiments of the two-dimensional prominent point processing method used in a synthetic aperture radar (SAR) system for removing a two-dimensional phase error in a complex image includes, generating the complex image with a sensor, identifying a good quality unfocused isolated point target within the complex image, cropping a target and an immediate area surrounding the target, taking a two-dimensional inverse Fast Fourier Transform (FFT) to obtain a phase history, and taking a two-dimensional phase from the phase history of the cropped target as a measurement of the two-dimensional phase error on the image.

An exemplary embodiment of the one-dimensional phase estimate of higher order two dimensional phase errors provides for a method for slow-time error correction with one-dimensional phase estimate of higher order two-dimensional phase errors in an image generated by a synthetic aperture radar, the method including, taking a small percentage in range of phase history which extends a full azimuth extent of the phase history to generate a low resolution range and high resolution azimuth sub-band image, focusing the low resolution range and high resolution azimuth sub-band image with a one-dimensional autofocus algorithm, mapping a resulting one-dimensional phase error estimate sample spacings as a function of angle, and scaling each of the phase estimate sample spacings to a center frequency using the ratio of a center frequency to an original phase history sample frequency, and applying to the phase history a two-dimensional correction mapping the one-dimensional phase equation $\phi(\theta/\theta_{max})$ to a two-dimensional phase equation as $$\phi_{2D}(u, v) = \phi\left(\tan^{-1}\left(\frac{u}{v}\right)\bigg/\theta_{max}\right)\sqrt{\frac{u^2 + v^2}{f_c}}.$$

Another exemplary embodiment of the one-dimensional phase estimate of higher order two dimensional phase errors provides a method for fast-time error correction with one-dimensional phase estimate of higher order two-dimensional phase errors in an image generated by a synthetic aperture radar, the method including, taking a small percentage in azimuth of phase history data centered on a set theoretical pulse to generate a low resolution azimuth and high resolution range sub-band image, focusing the low resolution azimuth and high resolution range image with a one-dimensional autofocus algorithm in a range direction, mapping a phase estimate sample spacings to a function of frequency, applying to the phase history a two-dimensional correction mapping a one-dimensional phase equation $\phi(f)$ to a two-dimensional phase equation as $\phi_{2D}(u,v)=\phi(\sqrt{u^2+v^2})$.

An exemplary embodiment of the fast SHARP parametric autofocus method used in a synthetic aperture radar (SAR) system for removing a one-dimensional azimuth phase error in an image generated by the SAR system includes, choosing a basis function from an orthonormal set, defining a positive mask and a negative mask based on a sign of the basis function derivative defined as a function of azimuth sample scaled to the interval [−1 1], splitting an azimuth dispersed, range compressed phase history aperture into two sub-apertures using the positive mask and the negative mask, collapsing the two sub-apertures and removing zeros, multiplying element-by-element each of the collapsed sub-apertures by a complex conjugate of the other sub-aperture, performing a one-dimensional azimuth fast Fourier transform (FFT) to form a complex cross correlate, detecting the complex cross correlate, summing across all columns, and defining an estimated coefficient of the basis function based on a peak location offset from DC.

Another exemplary embodiment of the fast SHARP parametric autofocus method used in a synthetic aperture radar (SAR) system for removing a two-dimensional slow-time phase error in an image generated by the SAR system includes, choosing a basis function from an orthonormal set, defining a positive mask and a negative mask based on the sign of the basis function derivative defined as a function of slow-time angle scaled to the interval [−1 1], splitting a fully dispersed phase history aperture into two sub-apertures using the positive mask and the negative mask, performing a one-dimensional range fast fourier transform (FFT) for each sub-aperture, collapsing the two sub-apertures and removing zeros, multiplying element-by-element each of the collapsed sub-apertures by a complex conjugate of the other sub-aperture, performing a one-dimensional azimuth FFT to form a complex cross correlate, detecting the complex cross correlate, summing across all columns, defining an estimated coefficient of the basis function based on a peak location offset from DC, defining a final two-dimensional phase error using the basis function defined as a function of slow-time angle scaled to the interval [−1,1], scaling the final two-dimensional phase error by a ratio of fast-time frequency to center frequency, and multiplying the scaled final two-dimensional phase error by the estimated coefficient to obtain a final error.

Yet another exemplary embodiment of the fast SHARP parametric autofocus method used in a synthetic aperture radar (SAR) system for removing a two-dimensional fast-time phase error in an image generated by the SAR system includes, choosing a basis function from an orthonormal set, defining a positive mask and a negative mask based on the sign of the basis function derivative defined as a function of fast-time frequency scaled to the interval [−1 1], splitting a fully dispersed phase history aperture into two sub-apertures using the positive mask and the negative mask, performing a one-dimensional range fast fourier transform (FFT) for each sub-aperture, collapsing the two sub-apertures and removing zeros, multiplying element-by-element each of the collapsed sub-apertures by a complex conjugate of the other sub-aperture, performing a one-dimensional range fast Fourier transform (FFT) for each sub-aperture, detecting the complex cross correlate, summing across all columns, and defining an estimated coefficient of the basis function based on a peak location offset from DC, defining a final two-dimensional phase error using the basis function defined as a function of slow-time angle scaled to the interval [−1,1], multiplying the scaled final two-dimensional phase error by the estimated coefficient to obtain a final error.

An exemplary embodiment of the two-dimensional optimization method used in a synthetic aperture radar includes, generating a complex image with a sensor defining a relative quality of a focus of the complex image with an optimization metric, searching for a phase error correction best suited to correct a phase error in the complex image with an algorithm, and correcting the phase error based on the phase error correction. It is an aspect of the embodiment that the phase error correction optimizes the optimization metric.

BRIEF DESCRIPTION OF THE INVENTION

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

Figure 1:
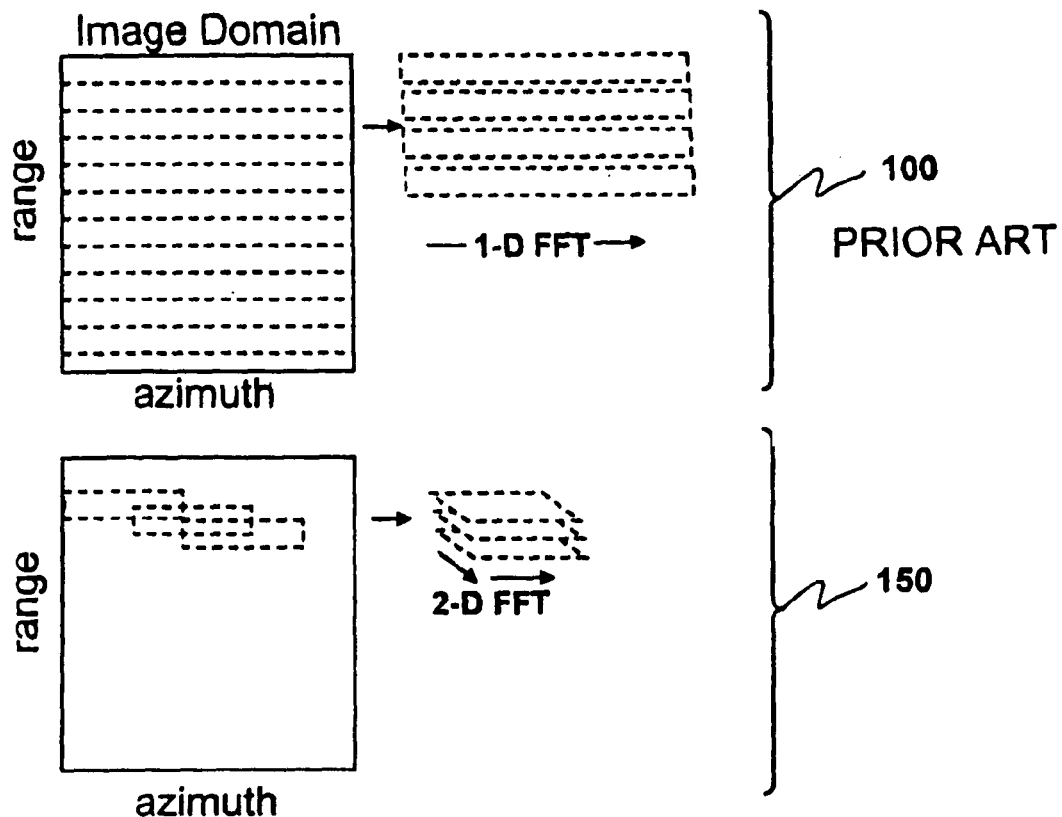
FIG. 1 illustrates a comparison between the previous one-dimensional autofocus stacking technique and the two-dimensional technique used by the methods of embodiments of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As mentioned above, previous autofocus techniques, based on one-dimensional estimates, are only capable of removing phase errors which appear as distortions of a target in the cardinal directions. However, SAR imagery which is collected with an antenna utilizing a large dwell angle (for example, UltraSAR) may contain phase errors in which the off-axis target distortions are significant. As such, the methods of the exemplary embodiments of the present invention seek to mitigate those phase errors which are not compensated for using the previous one-dimensional techniques.

It should be realized that the processing steps according to the exemplary embodiments of the present invention may be performed by a processor-based system. In one embodiment, the system may include an input/output ("I/O") interface, a processor and memory. It is contemplated that more than one interface may be utilized in the system. For example, one interface may be configured to receive inputs and a second interface may be configured to output data to a display. Further, multiple interfaces may be used to receive separate inputs without deviating from the scope and spirit of the exemplary embodiments of the present invention.

The memory may include data structure for storing data and one or more software algorithms. It should be noted that the system may take the form of any system capable of processing data received by a SAR sensor. The system may receive inputs from a SAR sensor and any additional devices which may be a part of the radar system. These inputs may include, for example, digital or analog image signals, signals from a navigation system or signals from any additional components.

The processor may be configured to run software algorithms for performing the method steps according to the various exemplary embodiments of the present invention. The software algorithms may be stored in a memory device, for example. The memory device may include, for example, non-volatile or volatile memory devices. The memory may also include data structure for storing data for later use. The memory may also include additional types of memory which is centrally located, dispersed or replicated in different storage media. For example, it may include a read-only-memory (ROM), random access memory (RAM), a write-once, read many (WORM) memory device, semiconductor-based storage, Flash memory, optical storage, phase change storage, magneto-optical storage or magnetic storage devices. In summary, any type of memory device having any type of configuration may be used for the memory.

Once the processor processes the received data as discussed in detail below, the results of the processing may be stored in memory or output to a display. Additionally, the outputs may be sent to, or accessed by, a separate system for use in further processing.

Many autofocus techniques make use of a set of non-interacting image subsets in a way such that the commonality between the subsets is the phase error, while effects from other sources tend to cancel out. This technique is called "stacking."

In the previous one-dimensional autofocus techniques, the subsets are typically delimited by range lines in the range compressed/azimuth dispersed phase history. For optimization methods, this is the factor that constrains the algorithm from applying a phase that attempts to focus the line down to a single point, since doing this would increase the sharpness of that line but would decrease the sharpness of all the other lines. For pulse pair product methods, this is typically performed by dividing the image in azimuth into overlapping subsets that may then be stacked one on top of the other in range. Since the phase error is the same in each of the subsets (although band-limited now since the subset is smaller than the original image), this may provide more data on which to estimate the phase error.

Two-dimensional autofocus techniques typically require multiple range lines per image subset in order to estimate the range component of these two-dimensional phase errors and, therefore, the previous stacking approach will not suffice. Further, in some autofocus methods, without some form of stacking, the constraints may not be present to prevent misguided phase error estimates that will remove real phase information that is important to the imagery.

To solve this problem, an image may be divided into a number of partially overlapping two-dimensional 'strips' of a predetermined size. These strips may then be stacked in a third dimension. The strips may then be used in a way such that the commonality between them, the two-dimensional phase error, may be obtained while effects from other sources may cancel out. FIG. 1 illustrates a comparison between the previous one-dimensional autofocus stacking technique 100 and the two-dimensional technique 150 used by the exemplary embodiments of the present invention.

The two-dimensional autofocus methods in an exemplary embodiment of the present invention include: (1) two-dimensional pulse pair product methods including shear PGA, eigenvector phase history ("EPH"), shear PGA/EPH; (2) two-dimensional optimization methods including parametric one-dimensional estimate/two-dimensional correction, parametric two dimensional estimate/two-dimensional correction, unconstrained two-dimensional nonparametric and constrained two-dimensional nonparametric methods; (3) a two-dimensional geometry filter method; (4) a two-dimensional prominent point processing method; (5) a one-dimensional phase estimate of higher order two dimensional phase errors; and, (6) a fast SHARP parametric autofocus method.

1. Two-Dimensional Pulse Pair Product Methods

Pulse Pair Product techniques operate on a modified phase history space. This modified space may be obtained by multiplying elements in one azimuth bin by the complex conjugate of the elements in another azimuth bin. This has the effect of subtracting the phases of these two azimuth bins, or "pulse pairs." The distance (i.e., the number of azimuth bins) between pulse pairs is referred to as the lag of the pulse pair product.

Pulse Pair Product methods divide the image into subsets and combine them such that the phase error, which is common to each subset, may be extracted while phase from other sources may cancel out. Often, this is performed on the phase gradient of the phase history (obtained by multiplying each complex sample by the complex conjugate of its neighbor forming lag 1 pulse pair products) instead of the phase history itself so as to eliminate the cumulative effects of differing phase constants from one image subset to the next. Additionally, each strip may be center shifted to remove the cumulative effects of different linear phases from one strip to the next. In one-dimensional autofocus techniques, image subsets may be range lines, while in two-dimensional autofocus techniques, the image subsets may be stacked two-dimensional image strips, as discussed above.

a. Shear Phase Gradient Autofocus

Figure 2A:
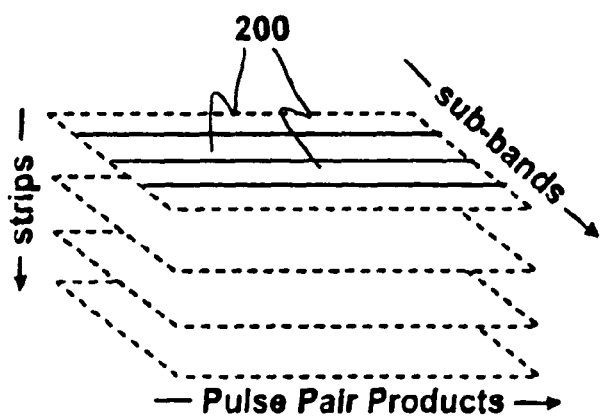
FIG. 2A illustrates the summing operation utilized by the two-dimensional Shear Phase Gradient Autofocus ("shear PGA") method according to an exemplary embodiment of the present invention.

The two-dimensional Shear Phase Gradient Autofocus ("shear PGA") method in an exemplary embodiment of the present invention obtains its phase error estimate by summing each pulse pair product sample over all strips, as illustrated in FIG. 2A. As shown in FIG. 2A, the two-dimensional shear PGA method may operate on pulse pairs, or phase gradients, in the azimuth direction and sub-bands 200 in the range direction.

Figure 2B:
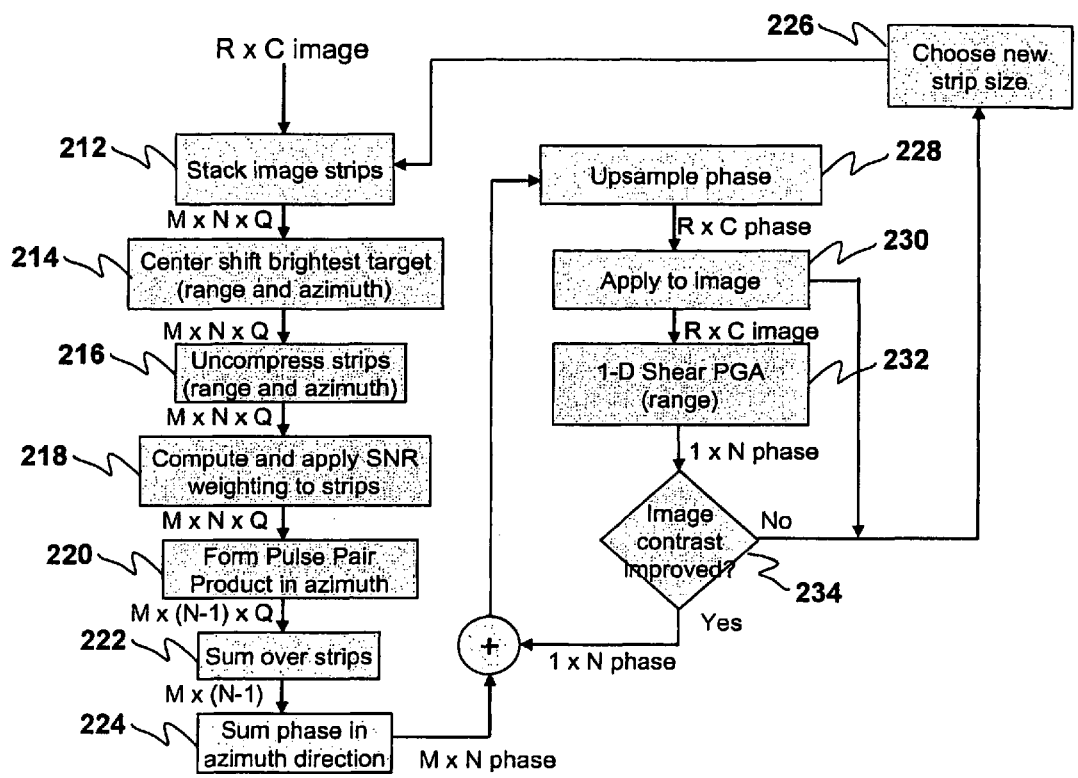
FIG. 2B illustrates a flow chart of the shear PGA method according to one embodiment of an exemplary embodiment of the present invention.

FIG. 2B illustrates a flow chart of the shear PGA method according to one embodiment the present invention. As shown in FIG. 2B, pulse pair products may be created along the azimuth dimension 212-220, but preferably not the range dimension. Once the estimate of the phase gradient is obtained, each sub-band may be summed in azimuth (integrated) 222 and 224 to obtain the final phase error estimate. Since each sub-band integration result may contain an arbitrary phase constant, the change in this constant from sub-band to sub-band may form an arbitrary range phase error which may be removed via one-dimensional range autofocus 226-234. Additionally, each strip may have the pixels with the highest amplitude windowed and center-shifted in range and azimuth to mitigate problems due to linear phase differences between strips.

b. Eigenvector Phase History

Figure 3:
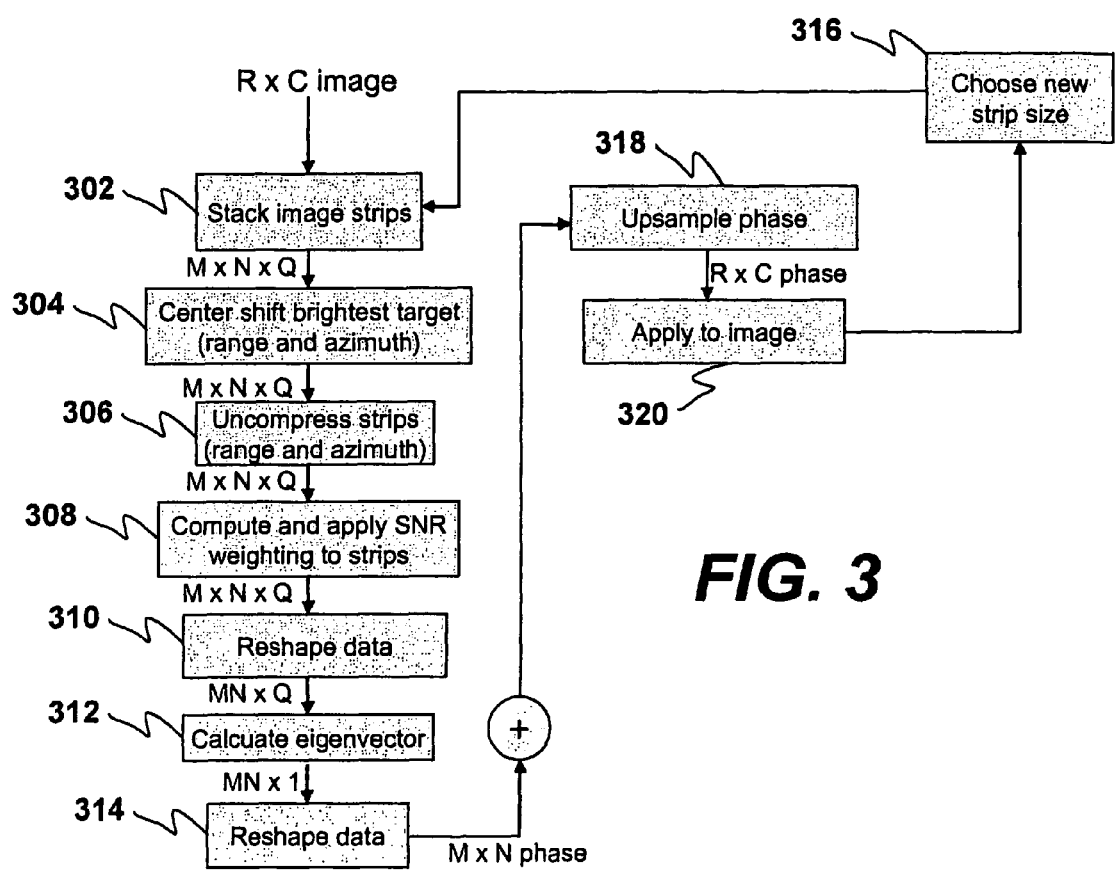
FIG. 3 illustrates a flow chart of the two-dimensional eigenvector phase history ("EPH") method according to an exemplary embodiment of the present invention.

The eigenvector phase history ("EPH") method in an exemplary embodiment of the present invention obtains a phase error estimate through an eigenvector estimation approach. FIG. 3 illustrates a flow chart of the EPH method according to one embodiment of the present invention. As shown in the figure, if each phase history sample in an M×N strip is viewed as an observation of an MN dimensional data point and the image is divided into Q strips, we have Q data points from an MN dimensional space.

The covariance matrix of this data may contain some useful properties. In particular, each element of the covariance matrix is a pulse pair product, where elements on the diagonal are lag 0, elements on the off diagonal are lag 1, and so forth. The first eigenvector of the covariance matrix (the eigenvector corresponding to the largest eigenvalue) 312 may then be calculated. This may correspond to the phase error that maximizes the coherency of the phase history. This, in turn, may correspond to a focused target. As with many other pulse pair product methods, this method may require identifying each strip may have the pixels with the highest amplitude windowed and center shifted 304. In one embodiment, the center shilling is in both range and azimuth, as shown at step 306.

c. Shear PGA/EPH

Figure 4:
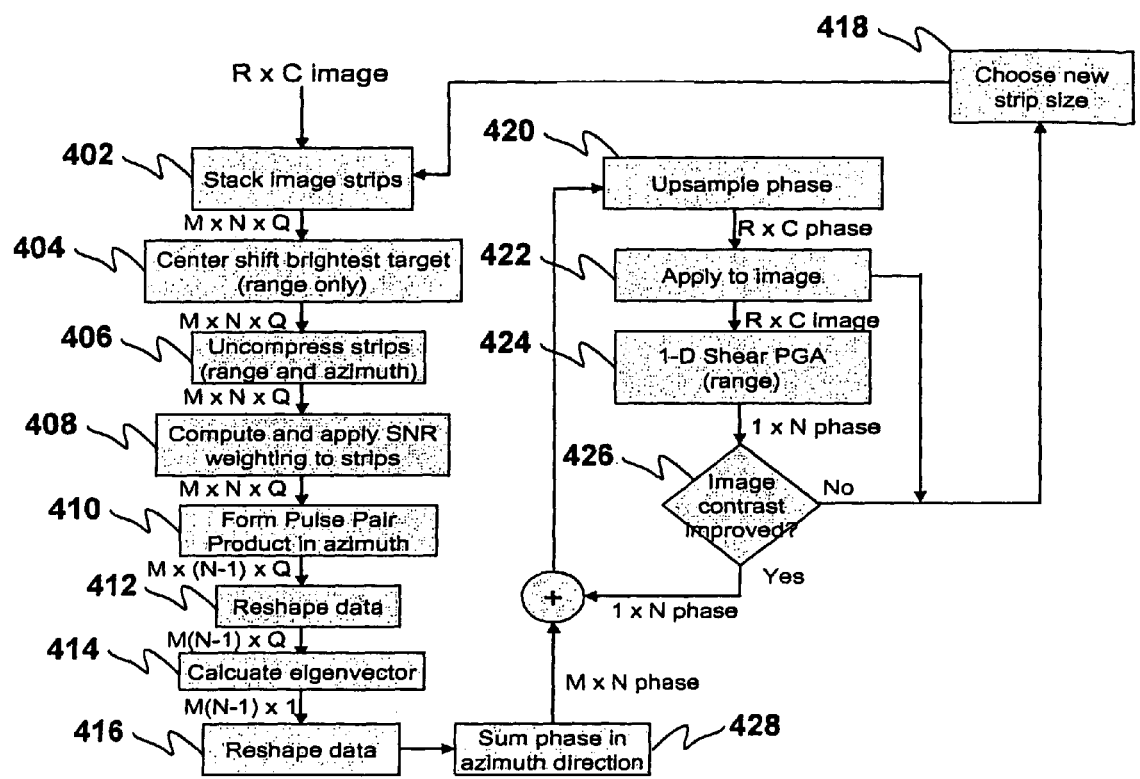
FIG. 4 illustrates a flow chart of the two-dimensional shear PGA/EPH method according to an exemplary embodiment of the present invention.

The two-dimensional shear PGA/EPH method in an exemplary embodiment of the present invention works as a combination of the shear PGA and EPH methods discussed above. A flowchart illustrating the method is illustrated in FIG. 4. The method may operate on azimuth phase gradients within range sub-bands, but may obtain its phase error estimate across the strips by calculating the first eigenvector 414 of the gradient sample covariance matrix. Although center shifting may still be required in range, it may not be required in azimuth. Thus, the shear PGA/EPH method may robustly handle range and azimuth constant phase differences from strip to strip, as well as azimuth linear phase differences. Additionally, it may handle range linear phase differences as robustly as both the EPH and shear PGA methods.

A summary of the two-dimensional pulse pair product methods discussed above is set forth in Table 1, below. It should be noted that the shear PGA and the shear PGA/EPH methods must be followed up by a one-dimensional range autofocus algorithm.

TABLE 1

| Algorithm | Center-shifting & Windowing? | Operate on Pulse Pair Product? | Eigenvector estimate? | Comments |
| --- | --- | --- | --- | --- |
| Shear PGA | Yes | Yes (in azimuth) | No (summation of strips instead) | Must be followed up by 1-D range AF. |
| EPH | Yes | Not explicitly (via eigenvector estimation) | Yes | |
| Shear PGA/EPH | Yes (in range only) | Yes (in azimuth) | Yes | Must be followed up by 1-D range AF |

2. Two-Dimensional Optimization Methods

In the context of SAR radar, optimization refers to the class of autofocus techniques in which a search may attempt to find the best phase correction that maximizes an optimization metric. There are two broad categories of optimization: parametric and non-parametric. For parametric techniques, a parametric form of the phase, such as the $2^{nd}$-nth order Legendre polynomials, may be decided and then the coefficients of these phase functions may be optimized. Search methods including, but not limited to, the Golden Section Search (which does not require calculation of the optimization metric gradient) may be used for this problem.

On the other hand, nonparametric techniques may attempt to estimate a sampled version of the phase itself without prior knowledge of its functional form. The high-dimensional search space of this problem may require a search method that will make use of the optimization metric gradient for improved efficiency. For example, the L-BFGS-B search method known to those of skill in the art may be used. Derivation of a closed form solution of the gradient may be nontrivial. Numerical gradients may be used, however they can be slow to calculate and may introduce small errors in their approximations. Therefore, analytical gradients are utilized in the preferred embodiment of the present invention.

Nonparametric techniques may be subdivided into unconstrained and constrained methods. Unconstrained two-dimensional nonparametric methods utilized in an exemplary embodiment of the present invention may produce an independent phase error estimate for each phase history sample in the two-dimensional sample grid.

Constrained two-dimensional nonparametric methods may impose constraints on the two-dimensional phase error estimates. An example of a constrained two-dimensional phase error is a two-dimensional azimuth phase error. This error may change from pulse to pulse, but may scale with the inverse of the along pulse frequency. For one-dimensional techniques, it may be assumed that this phase error is defined along the polar formatted azimuth coordinate direction. However, in reality, this error is defined along the curvature of the polar geometry. As such, in one embodiment of the present invention, the two-dimensional nonparametric method, this error may be represented as a one-dimensional vector, with knowledge that this vector may be a function of dwell angle rather than azimuth sample number.

While the embodiments discussed below make reference to specific techniques, it should be realized that other search techniques or optimization metrics known to those of skill in the art may also be included without deviating from the scope and spirit of the present invention. Alternative optimization metrics may include, but are not limited to, entropy or various combinations of sharpness, entropy and coherency. Additionally, combinations of the various metrics discussed herein may include line weighting in the azimuth direction as well as the range direction (for example, a weighted average of the metric in each of the two directions).

a. Parametric One-Dimensional Estimate/Two-Dimensional Correction Method

The simplest extension of one-dimensional parametric optimization to two dimensions may be to estimate the error using the one-dimensional technique and apply the error in two dimensions. This may be done because the functional form of these errors are known, and can therefore be scaled and mapped onto the two-dimensional polar geometry. The potential problem with this method is that the phase error may scale with range frequency, and there may be no way to know if the one-dimensional estimated phase error over-represents one part of the range bandwidth over other parts. The exemplary embodiments of the present invention may make a simplifying assumption that the measured one-dimensional phase error may be representative of the phase error at the range center frequency. Each phase history sample may then be mapped from the range/azimuth coordinate system to the range frequency/azimuth angle coordinate system. The parametric phase error may then be applied as a function of azimuth angle with proper scaling as a function of range frequency. The main increase in computational burden for this method is the two-dimensional phase correction, which may require two full two-dimensional Fast Fourier Transforms ("FFTs"), but only at the end of the method.

This method may also be used to apply a nonparametric one-dimensional estimate in two dimensions. The FFT of the one-dimensional high order nonparametric phase error estimate may give the coefficients of the Fourier Series parameterization of the phase error. The estimates for each order of Fourier polynomials may then be appropriately scaled and applied in two dimensions along the polar geometry.

b. Parametric Two-Dimensional Estimate/Two-Dimensional Correction Method

In this embodiment of the present invention, the parametric phase function may be assumed to be a function of azimuth angle instead of falling along the one-dimensional azimuth coordinate direction. Each iteration of the search may require two full two-dimensional FFTs to apply the phase correction in two dimensions. This method has the potential to produce a more accurate phase error estimate than the one-dimensional approach, since there are no approximation errors due to mapping a one-dimensional phase error estimate to a two-dimensional phase correction.

c. Unconstrained Two-Dimensional Nonparametric Method

Unconstrained two-dimensional nonparametric optimization may estimate a phase error for each location in a two-dimensional grid covering the phase history. The phase error estimates may be determined as those values which optimize some metric. In order to describe this approach, we first derive the one-dimensional nonparametric optimization, and then extend it to two-dimensions, as discussed in detail below.

To calculate the one-dimensional sharpness gradient, the normalized sharpness S may be defined as $$S = \frac{1}{MN}\sum_{m=1}^{M}\sum_{n=1}^{N}|A_{nm}|^4 = \frac{1}{MN}\sum_{m=1}^{M}\sum_{n=1}^{N}(A_{mn}A_{mn}^*)^2, \quad (1)$$

the normalized line sharpness $S_{line}$ as $$S_{line} = \frac{1}{MN}\sum_{m=1}^{M} w_m^{line}\sum_{n=1}^{N}|A_{mn}|^4, \quad (2)$$

and the normalized column sharpness $S_{col}$ as $$S_{col} = \frac{1}{MN}\sum_{n=1}^{N} w_n^{col}\sum_{m=1}^{M}|A_{mn}|^4; \quad (3)$$

In all of the above equations, A is a complex image with M rows and N elements, and the weighting factors serve the purpose of power-normalization. They are defined as $$w_m^{line} = \frac{1}{\left[\frac{1}{N}\sum_{n=1}^{N}|A_{mn}|^2\right]^2} \quad (4)$$

$$w_n^{col} = \frac{1}{\left[\frac{1}{M}\sum_{m=1}^{M}|A_{mn}|^2\right]^2} \quad (5)$$

An important interpretation of the line sharpness may be obtained by rewriting equation (2) as $$S_{line} = \frac{1}{M}\sum_{m=1}^{M} w_m^{line}\left(\frac{1}{N}\sum_{n=1}^{N}|A_{mn}|^4\right) \quad (6)$$

$$= \frac{1}{M}\sum_{m=1}^{M} w_m^{line} s_m = \langle w_m^{line} s_m \rangle;$$

$$s_m \equiv \frac{1}{N}\sum_{n=1}^{N}|A_{mn}|^4$$

that is, the image line sharpness is the mean of the ensemble of sharpnesses for each line normalized by its respective power.

In the case of one dimensional azimuth autofocus, the phase error may be a function of the dispersed azimuth domain, which may be related to the image via a one-dimensional DFT:

$$A_{mn} = \sum_{l=1}^{N} \tilde{a}_{ml} K_{row}(n, l) e^{j\psi_l} \quad (7)$$

where the DFT kernel function is defined as $$K_{row}(n, l) = e^{j2\pi \frac{(l-1-N/2)(n-1-N/2)}{N}} \quad (8)$$

The phase correction function may be expanded as a series of basis functions $b_l^p$ with coefficients $\alpha_p$ via $$\psi_l = \sum_{p=1}^{P} \alpha_p b_l^p \quad (9)$$

For one-dimensional azimuth autofocus, it may be useful to employ the line-normalized sharpness, and so we will consider the computation of the gradient of equation (2). Now, the derivative of the line sharpness with respect to generic $p^{th}$ basis coefficient $\alpha_p$ may be calculated as:

$$\frac{\partial}{\partial \alpha_p} S_{line} = \frac{1}{MN}\sum_{m=1}^{M} w_m^{line} \frac{\partial}{\partial \alpha_p} \sum_{n=1}^{N}(A_{mn}A_{mn}^*)^2 \quad (10)$$

$$= \frac{1}{MN}\sum_{m=1}^{M} 2w_m^{line} \sum_{n=1}^{N}(A_{mn}A_{mn}^*)$$

$$\left(A_{mn}\frac{\partial A_{mn}^*}{\partial \alpha_p} + \frac{\partial A_{mn}}{\partial \alpha_p}A_{mn}^*\right)$$

$$= \frac{4}{MN}\sum_{m=1}^{M} w_m^{line} \sum_{n=1}^{N}(A_{mn}A_{mn}^*)\text{Re}\left(A_{mn}^*\frac{\partial A_{mn}}{\partial \alpha_p}\right)$$

-continued $$= \frac{4}{MN}\text{Re}\left(\sum_{m=1}^{M} w_m^{line} \sum_{n=1}^{N} A_{mn}(A_{mn}^*)^2 \frac{\partial A_{mn}}{\partial \alpha_p}\right)$$

With the aid of equations (7) and (9), we may write $$\frac{\partial A_{mn}}{\partial \alpha_p} = j\sum_{l=1}^{N} \tilde{a}_{ml} K_{row}(n, l) e^{j\psi_l} \frac{\partial \psi_l}{\partial \alpha_p} \quad (11)$$

$$= j\sum_{l=1}^{N} \tilde{a}_{ml} b_l^p K_{row}(n, l) e^{j\psi_l}$$

and thus equation (10) becomes $$\frac{\partial}{\partial \alpha_p} S_{line} = \frac{-4}{MN}\text{Im}\left(\begin{array}{c}\sum_{m=1}^{M} w_m^{line} \sum_{n=1}^{N} A_{mn}(A_{mn}^*)^2 \\ \sum_{l=1}^{N} a_{ml} b_l^p K_{row}(n, l) e^{j\psi_l}\end{array}\right) \quad (12)$$

$$= \frac{1}{M}\sum_{m=1}^{M} w_m^{line} \text{Im}\left\{\begin{array}{c}\frac{-4}{N}\sum_{l=1}^{N} a_{ml} b_l^p e^{j\psi_l} \\ \sum_{n=1}^{N} A_{mn}(A^{*mn})^2 K_{row}(n, l)\end{array}\right\}$$

$$= \frac{1}{M}\sum_{m=1}^{M} w_m^{line} g_m^p$$

$$= \langle w_m^{line} g_m^p \rangle;$$

$$g_m^p \equiv \text{Im}\left\{\frac{-4}{N}\sum_{l=1}^{N} a_{ml} b_l^p e^{j\psi_l} \sum_{n=1}^{N} A_{mn}(A_{mn}^*)^2 K_{row}(n, l)\right\}$$

Thus, the gradient of the image line sharpness is the mean of the ensemble of gradients of the individual lines, with each of these power normalized. In the event that $b_l = \delta(l-l')$, the sharpness of an individual line simplifies to $$g_m^l g_m^p = \text{Im}\left\{\frac{-4}{N} a_{ml} e^{j\psi} \sum_{n=1}^{N} A_{mn}(A_{mn}^*)^2 K_{row}(n, l)\right\} \quad (13)$$

from which a full non-parametric gradient of a line and the resultant image may be formulated as $$\vec{g}_m = [g_m^1; g_m^2; \ldots]^w \quad (14)$$

$$= \frac{-4}{N}\text{Im}\left\{\vec{a}_{m\cdot} * e^{j\psi} .* DFT1\left\{\vec{A}_{m\cdot} .* (\vec{A}_{m\cdot})^{.2}\right\}\right\}$$

$$\nabla S_{line} = \frac{1}{M}\sum_{m=1}^{M} w_m^{line} \vec{g}_m = \langle w_m^{line} \vec{g}_m \rangle \quad (15)$$

The gradient in two dimensions may now be calculated.

For the two dimensional case, we have a phase error that varies as a function of dispersed range as well as azimuth. The basis function expansion of the correcting phase now becomes $$\psi_{kl} = \sum_{p=1}^{P} \alpha_p b_{kl}^p \qquad (16)$$

where the added subscripts indicate the range dependence. Thus, the image may now be expressed as two dimensional DFT of a phase history, $$A_{mn} = \sum_{k=1}^{M} \sum_{l=1}^{N} a_{kl} K_{col}(m,k) K_{row}(n,l) e^{j\psi_{kl}} \qquad (17)$$

where a is the complex phase history and the DFT kernel function along the range dimension is given by $$K_{col}(m,k) = e^{j2\pi \frac{(m-1-M/2)(k-1-M/2)}{M}} \qquad (18)$$

The analog to equation (10) for the two dimensional case may be derived from equation (1) to be $$\frac{\partial}{\partial \alpha_p} S = \frac{4}{MN} \operatorname{Re}\left( \sum_{m=1}^{M} \sum_{n=1}^{N} A_{mn}(A_{mn}^*)^2 \frac{\partial A_{mn}}{\partial \alpha_p} \right) \qquad (19)$$

and from equations (16), and (17), we may write $$\frac{\partial A_{mn}}{\partial \alpha_p} = j \sum_{k=1}^{M} \sum_{l=1}^{N} a_{kl} K_{col}(m,k) K_{row}(n,l) e^{j\psi_{kl}} \frac{\partial \psi_{kl}}{\partial \alpha} \qquad (20)$$

$$= j \sum_{k=1}^{M} \sum_{l=1}^{N} a_{kl} b_{kl}^p K_{col}(m,k) K_{row}(n,l) e^{j\psi_{kl}};$$

By substituting equation (20) back into equation (19), the following result may be obtained:

$$\frac{\partial}{\partial \alpha_p} S = \qquad (21)$$

$$\frac{-4}{MN} \operatorname{Im}\left( \sum_{m=1}^{M} \sum_{n=1}^{N} A_{mn}(A_{mn}^*)^2 \sum_{k=1}^{M} \sum_{l=1}^{N} a_{kl} b_{kl}^p K_{col}(m,k) K_{row}(n,l) e^{j\psi_{kl}} \right)$$

Thus, equation (21) may be used to populate a gradient vector by repeating the above calculation for each basis function in the expansion of the correcting phase. If $b_{kl} = \delta(k-k', l-l')$, then equation (21) becomes $$\frac{\partial}{\partial \alpha_p} S = \frac{-4}{MN} \operatorname{Im}\left( a_{kl} e^{j\psi_{kl}} \sum_{m=1}^{M} \sum_{n=1}^{N} A_{mn}(A_{mn}^*)^2 K_{col}(m,k) K_{row}(n,l) \right) \qquad (22)$$

where we have substituted k',l' with k,l. As before, this expression may be used to efficiently compute a non-parametric gradient, following readily in compact form as $$\nabla S = \operatorname{reshape}\left\{ \frac{-4}{MN} \operatorname{Im}(\vec{a}.*e^{j\vec{\psi}}.*DFT2(\vec{A}.*(\vec{A}).^2)), M \cdot N \right\} \qquad (23)$$

In one-dimensional autofocus, the signal in range is not uncompressed because the phase errors generally manifest solely one-dimensional artifacts, which may be a smearing of an IPR in azimuth. This is generally sufficient provided that the phase error is appropriately bandlimited. Beyond this bandlimit, however, the phase errors tend to spread over more than one range cell because of the polar nature of the collected phase history. The particular bandlimit for a given image may be inversely proportional to the azimuth resolution therein. Thus, with today's SAR systems striving to achieve sharper resolution, the probability increases for manifesting phase errors whose artifacts migrate out of a range bin.

The idea for two-dimensional autofocus is to create a set of "non-interacting groups" and maximize their collective sharpness. For images whose IPRs exhibit range walk due to phase errors, this may involve creating a set of image strips of range thickness not much greater than the expected range walk. The idea is that energy for scatterers located near the center of the strip may be mostly contained entirely within the strip. The effect of having these scatterers may be mitigated, though, by including a degree of overlap in the definition of strips. Therefore, for another strip, the scatterer may now be located near its center. Thus, one can think of taking an image, cutting it into overlapping strips, and then creating an "image cube" by stacking each overlapping image strip on top of each other.

The idea, then, is to focus the image cube by maximizing the sharpness of the ensemble of image strips that make up the cube. In this way, the dimensionality of the unknown phase correction function may be reduced drastically, from on the order of M·N to $M_{strip} \cdot N$, where $M_{strip}$ is the size of a strip in range. This may greatly simplify the ensuing optimization operations.

With reference to the one-dimensional case, the strips are analogous to lines in the sense that they are non-interacting. Thus, in one embodiment of the present invention, the sharpness of each strip may be power denormalized as may be done for each line in the one-dimensional method. If the total number of strips is Q, the associated sharpness of the resulting image cube may be written from analogy with the 1D power normalized line sharpness, giving $$S_{cube} = \frac{1}{QM_{strip}N} \sum_{q=1}^{Q} w_q^{strip} \sum_{m=1}^{M_{strip}} \sum_{n=1}^{N} |A_{mn}^{strip}|^4 = \frac{1}{Q} \sum_{q=1}^{Q} w_q^{strip} \tilde{s}_q \quad (24)$$

with the sharpness of each strip expressed as $$\tilde{s}_q = \frac{1}{M_{strip}N} \sum_{m=1}^{M_{strip}} \sum_{n=1}^{N} |A_{mn}^{strip}|^4, \quad (25)$$

and with power normalization $$w_q^{strip} = \frac{1}{\left[\frac{1}{M_{strip}N} \sum_{m=1}^{M_{cap}} \sum_{n=1}^{N} |A_{mn}^{strip}|^2\right]^2} \quad (26)$$

With regard to the gradient, we may also express equation (23) by analogy to equation (15) as $$\nabla S_{cube} = \frac{1}{Q} \sum_{q=1}^{Q} w_q^{strip} \vec{g}_q^{strip} \quad (27)$$

with the gradient of each strip given as $$\vec{g}_q^{strip} \equiv \text{reshape}\left\{\frac{-4}{M_{strip}N} \text{Im}\left(\frac{\vec{a}_q \cdot * e^{j\vec{\psi}} \cdot *}{DFT2(\vec{A}_q^{strip} \cdot * ((\vec{A}_q^{strip})^*) .2)}\right), M_{strip} \cdot N\right\} \quad (28)$$

Unconstrained two-dimensional nonparametric optimization approaches require stacking of image strips in the same way that one-dimensional nonparametric optimization techniques require multiple range lines on which to operate. Strips in the two-dimensional case, and range lines in the one-dimensional case, are data points. If only a single data point exists, there is nothing to limit the optimization from removing all phase effects, including those beyond the phase error. The end result may be an image that is incorrectly focused down to a single point. Stacking may introduce more data points, and with a sufficient number of strips, the optimization method may converge on the proper phase error while other phase effects may tend to appear random and balance out over the collection of strips.

Finally, techniques which estimate phase errors based on the first eigenvector of the sample covariance matrix have been shown to be equivalent to optimizing a coherent sum. For example, zero lag (phase history) two-dimensional optimization is $$C = -\sum_{m} \left|\sum_{l} \sum_{k} a_{lk}^m e^{j\phi_{lk}}\right|^2$$

where $a^m_{lk}$ is the (l, k)th sample from the phase history of the mth strip, and $\phi_{lk}$ is the phase applied to the (l, k)th sample of each strip. A closed form solution of the two-dimensional gradient may be derived. This may be used in conjunction with the L-BFGS-B technique to obtain the nonparametric phase error solution for two-dimensional autofocus.

d. Constrained Two-Dimensional Nonparametric Method

The difficulty with a full two-dimensional nonparametric approach is that the number of parameters to be estimated may equal the number of support samples in the phase history of each strip. For even modest strip sizes, the number of parameters may be very large and, therefore, the computational burden of this approach may be large.

As a less computationally intensive alternative, a constrained nonparametric optimization technique has been constructed in which the error may be assumed to be a two-dimensional azimuth phase error (along the polar geometry). Both sharpness and coherency optimization metrics may be defined for the two-dimensional phase history sample grid using a one-dimensional vector which may be indexed by a theoretical pulse centered on each near side azimuth sample in the phase history. The phase of any given sample in the phase history may then be generated by interpolating between theoretical pulses using a spline, and then scaled appropriately by range frequency. A closed form gradient has been derived for each of the two optimization metrics.

Additionally, one of skill in the art will realize that any form of constraint for which the gradient of the optimization metric as a function of the phase can be derived may be utilized in this embodiment of the present invention. For example, the constraints of the polar geometry filter (discussed in detail below) may be used with the sharpness optimization metric by re-formulating sharpness in terms of the parameters of the polar geometry filter. This optimization function, along with its gradient (either a closed form solution if it can be derived or, in other embodiments, a numerical gradient), may be used in an optimization search (including, but not limited to, the L-BFGS-B technique) to obtain a solution.

3. Two-Dimensional Polar Geometry Model

The previously described high order phase error estimation techniques may produce a nonparametric estimate of the phase error which may not be explicitly constrained in any way. However, due to limitations of the data, the amount of noise, or the effectiveness of the optimization metric, these two-dimensional nonparametric phase error estimates may not capture some of the phase error characteristics which are known beforehand. In particular, we know that an azimuth phase error may introduce a different phase offset for each pulse. However, that offset, when appropriately scaled by frequency, should be consistent along any given pulse. In addition, a range phase error may be present, but it may be assumed that it is consistent from pulse to pulse.

Figure 5:
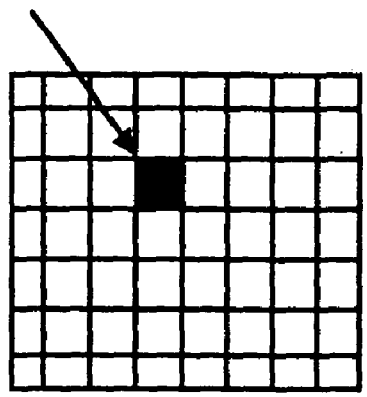
FIG. 5 illustrates the change of the coordinate system of the phase error estimate samples utilized by two-dimensional polar geometry filter method according to an exemplary embodiment of the present invention.
Figure 5:
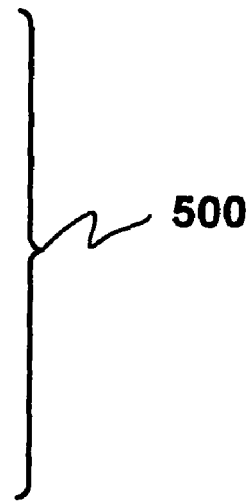
Figure 5:
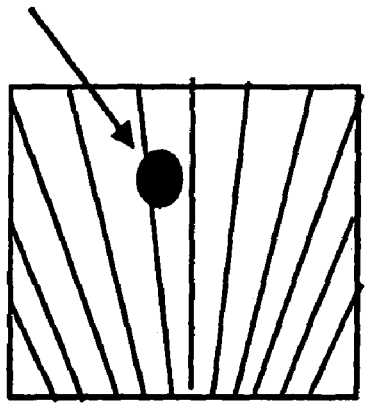
Figure 5:
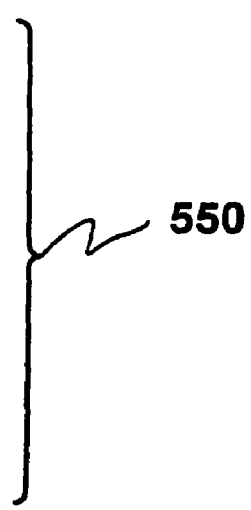

The previously described constraints may be imposed on the nonparametric phase error estimates by fitting to a model. To this end, two-dimensional phase error may be modeled as a combination of two components: a range error that is constant from pulse to pulse and a slow-time error. As illustrated in FIG. 5, this may essentially change the coordinate system of the phase error estimate samples from range/azimuth 500 to azimuth angle/range frequency 550.

For a given sample of the nonparametric two-dimensional phase error, the form of this model is as follows:

$$\phi(\text{freq},\text{angle})=F_1(\text{angle})\text{freq}/\text{freq}_0+F_2(\text{freq})$$

where freq is the range frequency of the phase error sample, angle is the azimuth angle of the phase error sample, $\text{freq}_0$ is the range center frequency, and $F_1$ and $F_2$ are respectively the angular and along pulse phase error functions. For each of these phase components, angular and range frequency may be represented parametrically and fit using minimum least squares criteria. This forms a tittered version of the two-dimensional error in which known constraints are reintroduced. The maximum order used for the parametric form of each component may be limited by the size of the strip used to estimate the phase error.

For example, one embodiment of the two-dimensional shear PGA/EPH method may use the polar geometry model to constrain the phase error estimate in each iteration. This may be further modified to use only the filtered phase error if it results in an improved contrast metric measurement over the non-filtered phase error. This may have the effect of only making use of the model when it adds useful information to the focus Finally, a one-dimensional contrast metric, such as line power normalized sharpness, is not always a good indicator of focus in both dimensions. A smearing of the targets in range may result in an increase in the line power normalized sharpness, and therefore this one-dimensional metric is not always a good indication of two-dimensional focus.

Therefore, in one embodiment of the present invention, it may be beneficial to use both the line power normalized sharpness metric and the column power normalized sharpness metric may be utilized. A combination of these two metrics may create a two-dimensional sharpness metric. A useful form of this has been found to be the root sum of squares of the two one-dimensional sharpness metrics (line normalized and column normalized).

Finally, in alternative embodiments of the model, phase errors may be limited to azimuth only (i.e., $F_2(x)=0$) or range only (i.e., $F_1(x)=0$). Additionally, while the embodiment discussed above may require all range phase errors to be consistent from pulse to pulse, range errors may be completely independent from pulse to pulse in the event that enough data is provided to fit the parameters. As such, by imposing constraints on the degree to which a range error may change from pulse to pulse, the robustness of the result may be improved.

4. Two-Dimensional Prominent Point Processing Method

Prominent point processing refers to the method of identifying a good quality unfocussed isolated point target within a SAR image, cropping that target and the immediate area surrounding it, and taking the phase from the phase history of this cropped target as the measurement of the phase error on the image. According an exemplary embodiment of the present invention, two-dimensional prominent point processing may be accomplished by estimating separable one-dimensional azimuth and range errors using a single extracted line and a single extracted column, respectively.

According to an exemplary embodiment of the present invention, a prominent point detector (PPD) may be used to accomplish two-dimensional prominent point processing. The PPD may be designed to identify good IPRs in an image, measure the phase on the IPR and use the measured phase to correct the phase error across the image. The PPD may use spatially variant apodization (SVA) to assist in a pixel classification task which categorizes pixels in the image into four main categories: mainlobes, strong sidelobes, weak sidelobes and clutter. For the mainlobes (sidelobes), a binary mask of the image may be created with ones indicating the pixel is a mainlobe (sidelobe) and zeros elsewhere.

Using the binary mask and the image itself, the peak location (in pixels) may be determined. In one embodiment, the location of peaks whose amplitude is above a given threshold and whose sidelobe levels are symmetric within a given width may be saved.

Given the location of the prominent points, a two-dimensional window may be taken such that it is centered on each peak in the image domain. An inverse FFT may then be applied, and the phase may be observed. This constitutes a set of phase error measurements and the locations in which they were measured. A simplified two-dimensional phase error may be obtained from two separable one-dimensional slices (range and azimuth) of a single target. However, for full two-dimensional phase errors, noise becomes a significant effect and a method of removing noise, such as combining multiple target phase errors, may be required. Methods of combination may include, but is not limited to, weighted averages of the phase in which a target's phase weight is a function of its correlation to the phases of other targets.

For example, a target's weight may be a function of the maximum correlation between that target's phase and any other target's phase in the image. In one embodiment, the targets considered for this maximum correlation may be restricted to fall within a certain distance from the current target.

Another method of reducing noise is to filter the full two-dimensional phase error, using, for example, a model such as the polar geometry model. Alternatively, two one-dimensional separable errors may be obtained, and a model such as the polar geometry model may be used to fit a full two-dimensional phase error.

5. Method for One-Dimensional Phase Estimate of Higher Order Two-Dimensional Phase Errors ("Fast2D")

Figure 6:
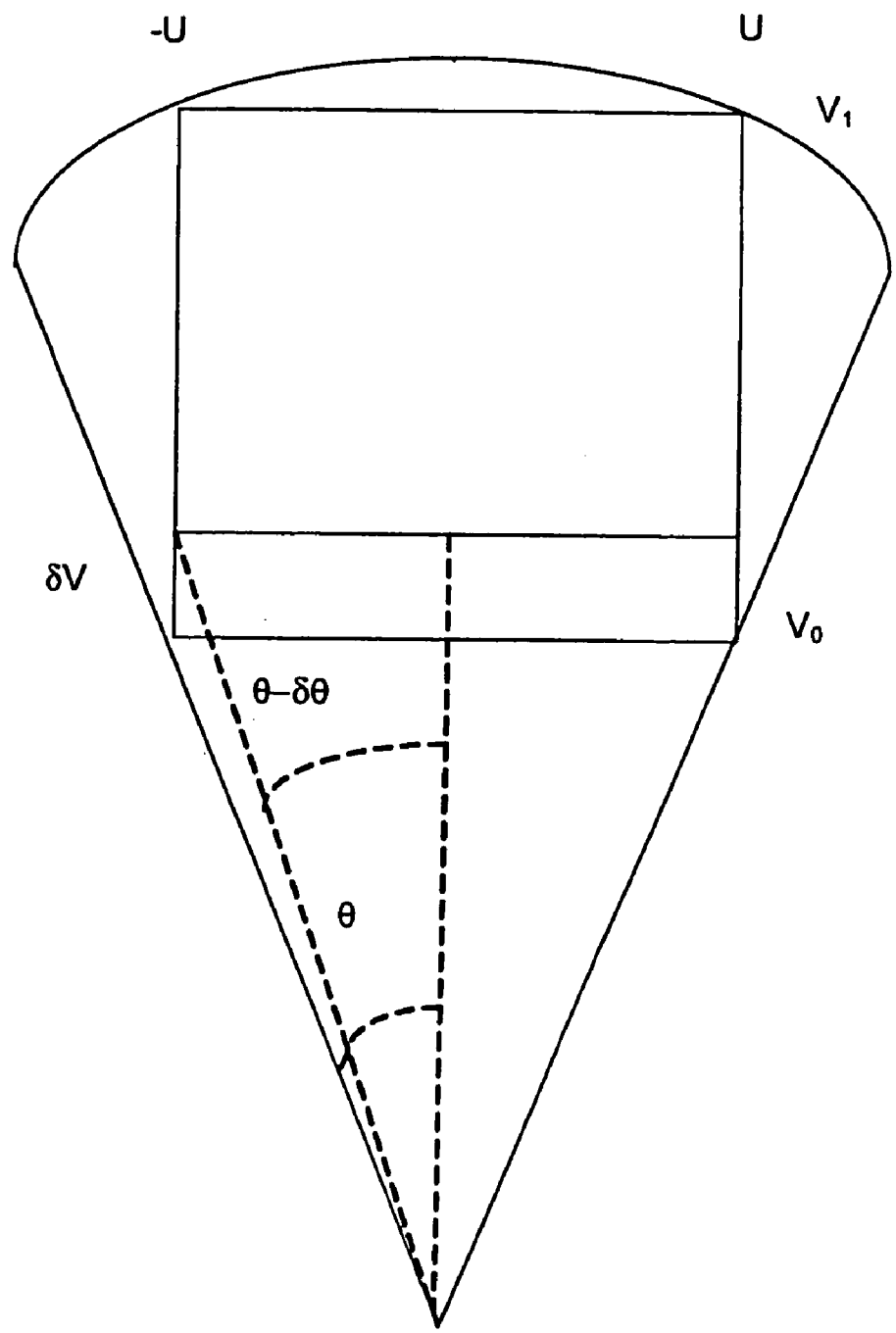
FIG. 6 illustrates phase history geometry in relation to a method for slow-time error estimation according to an exemplary embodiment of the present invention.

Phase errors can typically be broken down into errors that are along each pulse (a function of frequency) or represent a change from pulse to pulse (a function of angle). This decomposition may facilitate phase error analysis, and may greatly reduce the dimensionality of the phase error parameter vector, resulting in a more robust estimate. Therefore, it is desirable to obtain a set of one-dimensional phase error estimates representing the full two-dimensional phase error. For slow-time errors (a function of angle), this may be accomplished by focusing images made from taking the phase history and dividing it into subbands. If the subbands (in range) are narrow enough, the range bandwidth may be negligible, and the images may be low resolution. This may permit the simplifying assumption that samples within the same column, u, all occur at the same angle, $\theta$. This, in turn, may enable the use of one-dimensional autofocus techniques. It should be noted that it may be assumed that the phase error at the near range phase history is expressed as $\phi(\theta/\theta_{max})$ which scales the abscissa on $[-1,1]$. The area of the phase history, which may be used for the one-dimensional estimation is illustrated in the phase history shown in FIG. 6.

With the polar relationships $\tan(\theta)=u/v$ and $f=(u^2+v^2)^{1/2}$, it may be shown that the worst angular variation $\delta\theta$ is related to the range phase history width $\delta v$ of the rectangle by:

$$\delta v/BW = (1+(2/f_{rBW}-1)^2)\delta\theta/2$$

where BW is the bandwidth and $f_{rBW}$ is the fractional bandwidth (assuming $BW_{azm}=BW_{rag}$). This formula may indicate how much of the phase history range may be taken for phase error estimate for a tolerable $\delta\theta$. In one embodiment, $\delta\theta$ may be small enough so that the phase error does not vary much in the range direction over $\delta v$. Therefore, a one-dimensional estimator may be used. The near range in the phase history may be used so that full azimuth coverage may be obtained. It should also be noted that the full resolution may be maintained in azimuth.

In one embodiment of the present invention, the method for slow-time error correction is as follows:

1. Take a small percentage in range of the phase history which extends the full width (Doppler bandwidth) of the phase history. A particularly good candidate is the lowest frequency subband since it encompasses the full dwell angle.
2. Focus this low resolution range, high resolution azimuth image with one-dimensional autofocus.
3. Map the phase estimate sample spacings (a function of u) to a function of angle $\theta$, and scale each phase estimate to center frequency using the ratio of $(f_c/f_{u,v})$, where $f_c$ is the center frequency and $f_{u,v}$ is the frequency at the center of sample (u, v).
4. Apply to the full phase history as a two-dimensional correction mapping the one-dimensional phase equation $\phi(\theta/\theta_{max})$ to a two-dimensional phase equation as follows:

$$\phi_{2D}(u,v) = \phi\left(\tan^{-1}\left(\frac{u}{v}\right)/\theta_{max}\right)\frac{\sqrt{u^2+v^2}}{f_c}$$

This method may be varied by using a number of subbands distributed across the full range bandwidth of the phase history, resampling their corresponding phase error estimates to a common $\theta_i$ sample spacing (where $\theta_1, \ldots \theta_i, \ldots \theta_N$ spans the full dwell angle), and combining the subband estimates together to time a robust measurement of the slow-time phase error. This combination may take on a variety of forms, one of which is a simple averaging of corresponding samples across the different subbands. Other forms may involve elimination of the frequency scaling operation in step 3 above.

Figure 7:
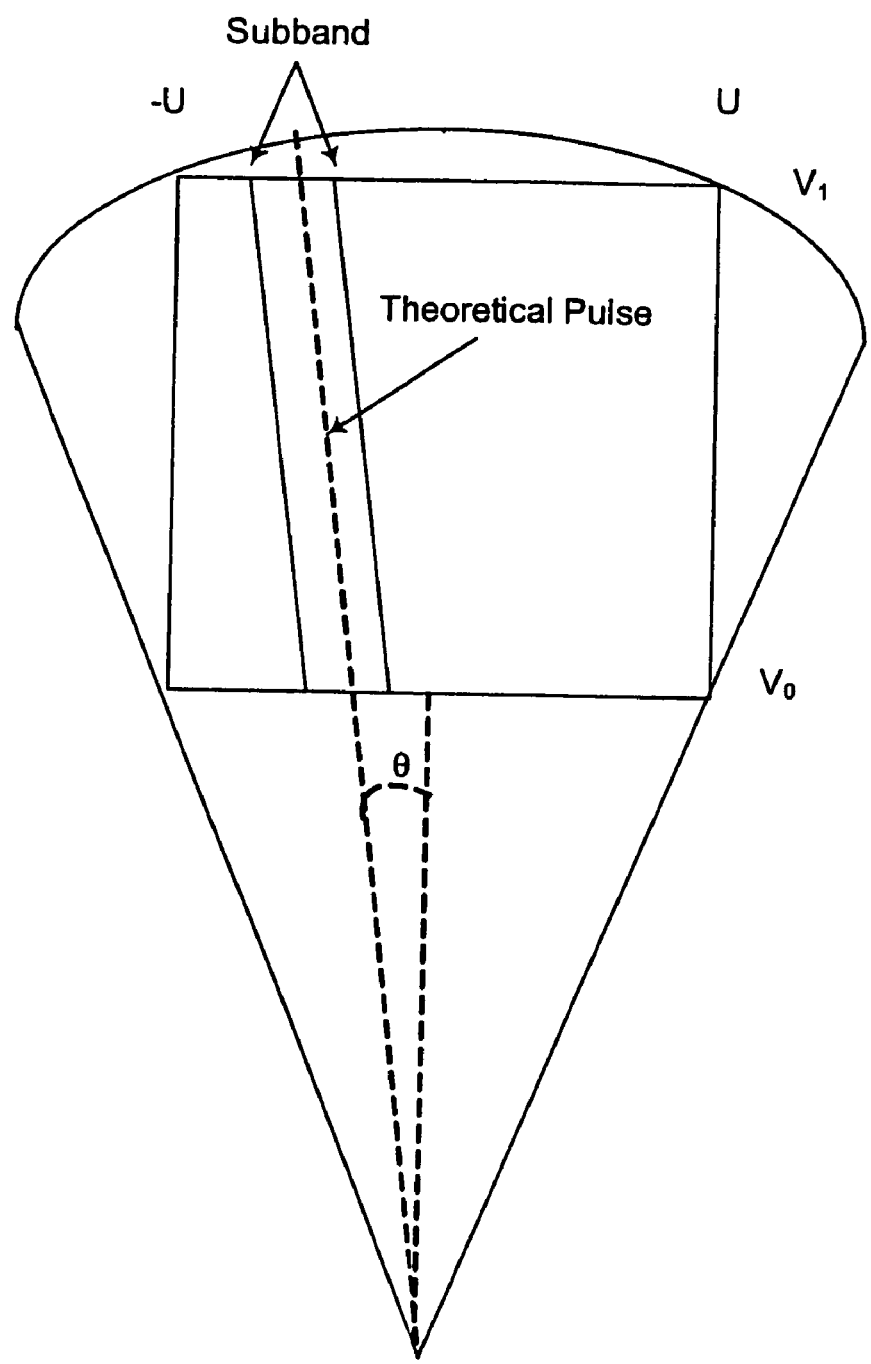
FIG. 7 illustrates phase history geometry in relation to a method for fast-time error estimation according to an exemplary embodiment of the present invention.

Similarly, the fast-time (along pulse) one-dimensional error may be obtained by creating reduced Doppler bandwidth subbands while maintaining the full range bandwidth. These subbands may be centered around a "theoretical pulse" —a line through the phase history which corresponds to a constant $\theta$. In one embodiment, the center of the dwell is operated on, since this pulse runs directly vertical. Therefore, the subband may not be skewed in the phase history. The Doppler bandwidth of a subband must be sufficiently small enough to facilitate the use of one-dimensional autofocus in the range direction, but large enough such that a robust estimate is obtainable in much the same way as was done for estimation of the slow-time error, discussed above. The area of the phase history in relation to fast-time error estimation is illustrated in the phase history shown in FIG. 7.

Thus, the method for fast-time error correction according to one embodiment is as follows:

1. Take a small percentage in azimuth of the phase history centered on a particular "theoretical pulse", $\theta$. A particularly good candidate is the center of the phase history where $\theta=0$ since this subband will not be skewed.
2. Focus this low resolution azimuth, high resolution range image with one-dimensional autofocus in the range direction
3. Map the phase estimate sample spacings (a function of v) to a function of frequency f.
4. Apply to the full phase history as a two-dimensional correction mapping the one-dimensional phase equation $\phi(f)$ to a two-dimensional phase equation as follows:

$$\phi_{2D}(u,v) = \phi(\sqrt{u^2+v^2})$$

In alternative embodiments, the method may be altered by distributing a number of subbands across the full dwell angle of the phase history, resampling their corresponding phase error estimates to a common $f_i$ sample spacing (where $f_1, \ldots f_i, \ldots f_N$ spans from the lowest to the highest frequency included in the polar formatted phase history), and combining the subband estimates together to form a robust measurement of the fast-time phase error.

In alternative embodiments, the Fast2D methods discussed above may also be adapted for two-dimensional amplitude autofocus by removing the frequency scaling in step 3, "$(f_c/f_{u,v})$", and the frequency scaling in step 4, $$\text{"}\frac{\sqrt{u^2+v^2}}{f_c}\text{"}.$$

Further, a variety of one-dimensional autofocus methods may be used to obtain the one-dimensional subband estimates. These may include, but are not limited to, the methods discussed above including PGA, EPH, Shear Averaging or other pulse pair methods, parametric or non-parametric optimization methods, Mapdritt, and Phase Difference Autofocus (PDAF).

6. Fast SHARP Parametric Autofocus Method ("FSHARP")

Figures 8A, 8B:
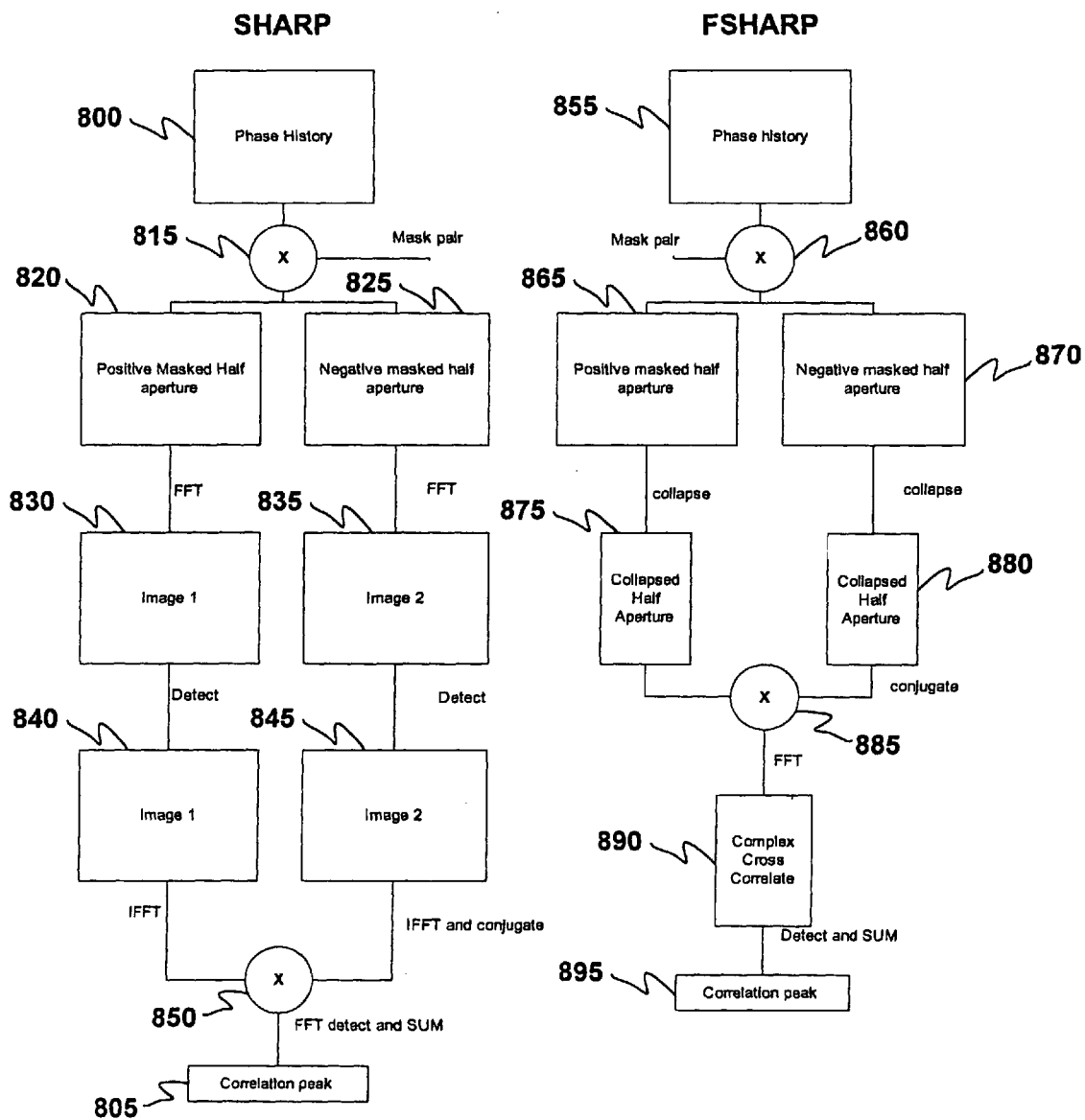
FIG. 8A illustrates a flow chart of the prior art SHARP autofocus method.
FIG. 8B illustrates a flow chart of the Fast SHARP ("FSHARP") parametric autofocus method according to an exemplary embodiment of the present invention.

A one-dimensional autofocus method known as SHARP is described in U.S. Pat. No. 5,854,602 to Stankwitz et al, hereby incorporated by reference in its entirety. The method is a parametric autofocus technique that, while being extremely robust, is very slow. An illustration of the SHARP method is illustrated in FIG. 8A. On the other hand. Phase Difference Autofocus (PDAF), described in U.S. Pat. No. 4,999,635 to Yuji, hereby incorporated by reference in its entirety, works on roughly the same principle (split aperture) but may be faster while sharing SHARP's robustness. Previously, PDAF has only been used for quadratic phase error estimation. The exemplary embodiment of the present invention, however, may allow fast high order parametric estimates.

As illustrated at step 800 in FIG. 8A, the SHARP method operates by first choosing a basis function from an orthonormal set, which may be labeled $L_n(u)$, where u is the azimuthal variable (slow time). The aperture may then be split (at step 815) into two sub-apertures, one 820 corresponding to $d_u L_n(u)>0$, and the other 825 corresponding to $d_u L_n(u)<0$. The sub-apertures may be generated by a complementary binary mask pair at the size of the full aperture. Detected images 830 and 835 may be formed for each sub-aperture. According to the shift theorem, linear phase may cause a shift in the image domain. To the extent that the phase error on the whole aperture has the chosen basis function as a non-zero component, the two sub-apertures may then shift their respective detected images in opposite directions. The shifts may be due to the surviving linear phase resulting from the masking. Cross correlation of the half aperture images and summation may yield a shifted peak, with the shift proportional to the coefficient of the basis function. Iteration may be required to refine the estimate of the coefficient.

PDAF works in a similar manner, but only for quadratic phase errors. The aperture may be split in two, then the half apertures may be multiplied (with an appropriate conjugation) and a Fourier Transform ("FT") may be performed. This yields a complex correlation. An inverse FT may then be applied to the result and the result may be summed. The peak shift from center may be proportional to the quadratic coefficient.

The FSHARP method in an exemplary embodiment of the present invention is illustrated in FIG. 8B. As illustrated, FSHARP may utilize a mask pair 865 and 870 (created at step 860 from a phase history 855) and may remove the zeros (known as "collapsing") from the half apertures (at steps 875 and 880). One of skill in the art will realize that the choice of basis functions may be important for the FSHARP method. In one embodiment, the basis functions may have ½ positive slope and ½ negative slope for the split aperture sizes to be equal. For example, sinusoid and sawtooth bases have this property, but Legendre polynomials do not. Chebyshev polynomials, however, do have this property and are recommended for polynomial HOPE expansions.

Further, it should be noted that even if the apertures are collapsed for conventional SHARP, the required number of Fourier Transforms may cause SHARP to be much slower than FSHARP. Additionally, the speed of the FSHARP method in an exemplary embodiment of the present invention may be increased in each iteration set by judicious choice of the seed value to relate the correlation shift to the basis coefficient through a constant of proportionality. In one embodiment, this may be accomplished by finding the best fit of a linear to either the positive or negative slope portions of the basis function, and scaling that linear to the amount of shift. This may then reduce the number of iterations.

Figure 8C:
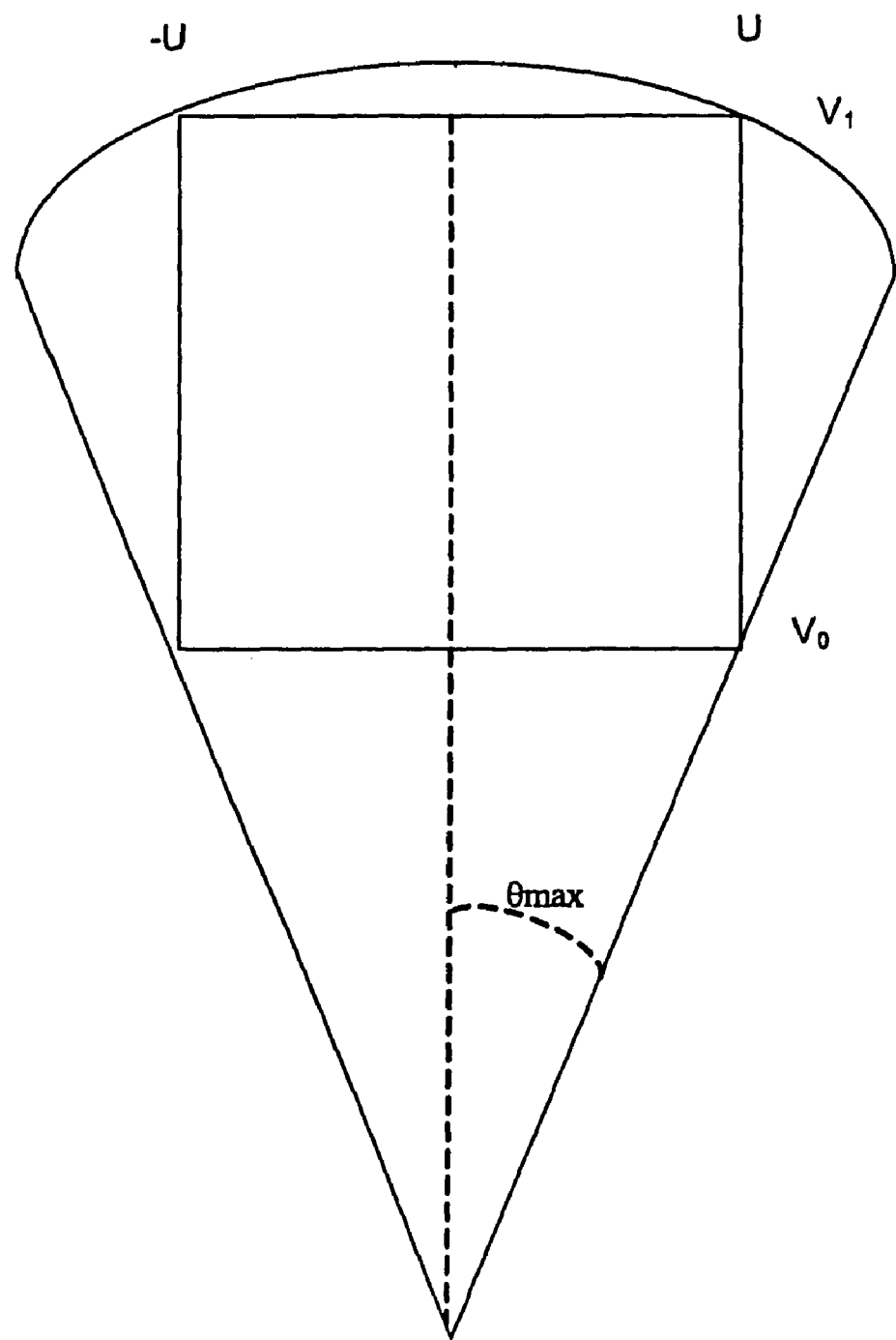
FIG. 8C illustrates the geometry of the two-dimensional polar formatted phase history utilized by an exemplary embodiment of the present invention.

As discussed earlier, two dimensional robust parametric techniques are needed for processing high resolution image data. The FSHARP method discussed above may be extended to the two dimensional case to mitigate slow-time phase errors. FIG. 8C illustrates the geometry of the two-dimensional polar formatted phase history. The basis function may be expressed along the collect angle as $L_n(\theta/\theta_{max})$. The phase correction may be applied $f/f_c L_n(\theta/\theta_{max})$. For polar formatted data, one may need to calculate the $(f,\theta)$ for each $(v,u)$ in the phase history to apply the correction properly. For polar coordinates, the correction is $$(v^2+u^1)^{1/2}/f_c L_n(\tan^{-1}(u/v)/\tan^{-1}(U/V_0)).$$

For two-dimensional FSHARP, all phase corrections may be applied in this manner. As in the one-dimensional case, two complementary binary apertures may be formed. However, the masks may vary in both u and v. The masks should be formed by pmask$(u,v)=\frac{1}{2}(\text{sgn}(d_0 L_n(\theta/\theta_{max}|_{\theta=arctan(u/v)})+1))$ and nmask=~pmask. Constructing the masks in this way may account for the number of cycles of a sinusoid across the aperture changing as the range increases or decreases, with the masks applied to a fully dispersed phase history. The cross-correlation proceeds as for FSHARP.

Figure 8D:
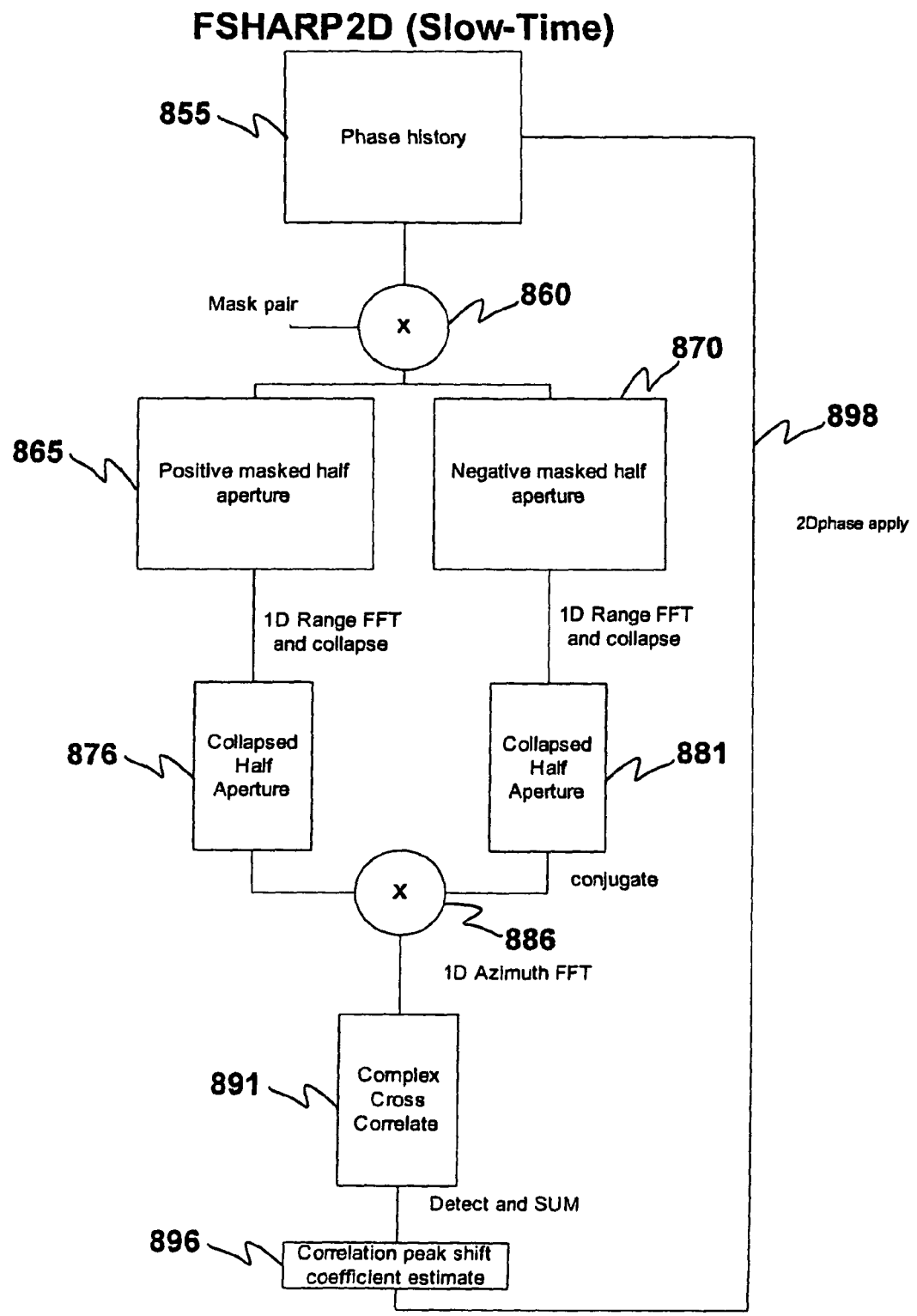
FIG. 8D illustrates another embodiment of the FSHARP method shown in FIG. 8B.

FIG. 8D illustrates another embodiment of the FSHARP method. Any residual phase error may cause some shift in azimuth for each image, which may be nonlinear but detectable with a cross-correlation. As shown in FIG. 8D, with an iterative section search 899, one may be able to obtain a reasonable phase error estimate for each basis function order. As an aside, FSHARP is fast because the aperture may be split in two. Thus, Chebyshev polynomials (sinusoids or sawtooth also work) may be used to split the two-dimensional FSHARP aperture exactly in two.

The collapse may not give uniform support in azimuth as a function of range for each of the half apertures. However, for the correlation, this may be inconsequential. Additionally, it should be realized that the highest number of cycles allowed for the estimate may be grating lobe limited. Finally, the correlation may be evaluated by looking at the sharpness of the correlation in early iterations and the offset of the correlation peak in later iterations. The correlation may be quite broad when the estimate is far from the actual value, and so the maximum may be hard to determine. The sharpness, however, may peak sharply at the actual value.

In alternate embodiments, the method may be used to correct fast-time phase errors. In this embodiment of the present invention, the basis function may be expressed along every pulse, which may be a function of frequency, as $L_n(2(f-f_s)/BW-1)$, where $f_s$ is the start (lowest) frequency. In other words, the function may be defined over the range of the pulse bandwidth normalized to the interval $[-1,1]$. Unlike the slow-time phase error, which may be scaled by $f/f_c$ when applied to the full two-dimensional phase history, no scaling may be required for the fast-time error. For polar formatted data, one may need to calculate the $(f,\theta)$ for each $(v,u)$ in the phase history to apply the correction properly. For polar coordinates, the correction is $$L_n(F(u,v))$$

where $F(u,v)$ is the normalized frequency and is defined as $$F(u,v)=2(sqrt(u^2+v^2)-V_0)/(sqrt(U^2+V_1^2)-V_0)-1.$$

Figure 8E:
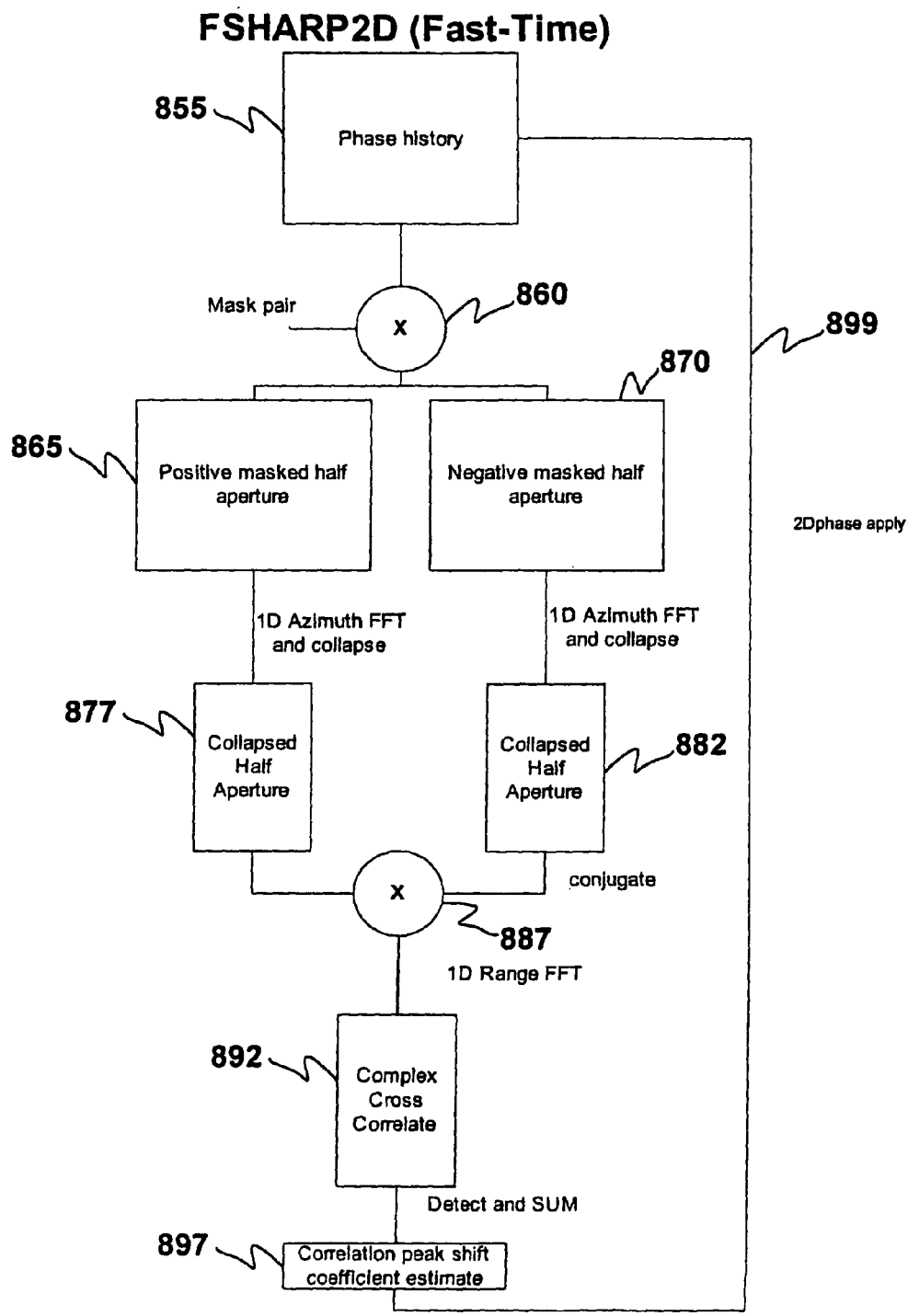
FIG. 8E illustrates yet another embodiment of the FSHARP method shown in FIG. 8B.

FIG. 8E illustrates yet another embodiment of the FSHARP method shown in FIG. 8B. In this embodiment, the masks may be formed by pmask$(u,v)=\frac{1}{2}(\text{sgn}(d_0 L_n(F(u,v))+1))$ and nmask=~pmask. Constructing the masks in this way may account for the changing angle at which pulses are placed in the polar formatted data as we move across the aperture, with the masks applied to a fully dispersed phase history. The cross-correlation may then proceed as for FSHARP, as discussed above.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

One or more of the application programs may be installed on the internal or external storage of the general-purpose computer having an internal or external memory for storing data and programs such as an operating system. Alternatively, in another implementation, application programs may be externally stored in and/or performed by one or more device(s) external to the general-purpose computer. Further, dedicated computers may be used to store and install the application programs.

The general-purpose computer includes a central processing unit (CPU) for executing instructions in response to commands, and a communication device for sending and receiving data. Examples of a delivery network include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link may include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage medium. A removable storage medium can include a floppy disk, magnetic tape, optical disk, etc., which can be removed from the storage drive used to perform read and write operations. As will be appreciated, the removable storage medium can include computer software and/or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in the main memory and/or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software may be stored in, or transmitted via, a computer program product and loaded into a computer system using, for example, a removable storage drive, hard drive or communications interface. The control logic (software), when executed by the processor, causes the processorto perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A two-dimensional polar geometry model method used in a synthetic aperture radar (SAR) system for removing a two-dimensional phase error in a complex image, the method comprising:

creating the complex image with a sensor;

modeling the two-dimensional phase error as a combination of a range error which is substantially identical from pulse to pulse and a slow-time error;

fitting an unconstrained two-dimensional estimate to the modeled two-dimensional phase error; and correcting the two-dimensional phase error to generate a corrected image.

2. The method according to claim 1, wherein the modeling the two-dimensional phase error is solely based on azimuth or range.

3. The method according to claim 1, wherein the modeled two-dimensional phase error is represented as two one-dimensional vectors or two sets of parametric basic vectors.

4. The method according to claim 3, wherein a contrast metric is used to determine whether to use a model fit of original data which maximizes the contrast metric.

5. The method according to claim 4, wherein the contrast metric utilizes a line-power normalization of the complex image, a column-power normalization, or both.

6. A computer-readable medium having computer-executable instructions for a two-dimensional polar geometry filter method used in a synthetic aperture radar (SAR) system for removing a two-dimensional phase error in a complex image, the computer-executable instructions configured to perform a method comprising:

creating the complex image with a sensor;

modeling the two-dimensional phase error as a combination of a range error which is substantially identical from pulse to pulse and a slow-time error;

fitting an unconstrained two-dimensional estimate to the modeled two-dimensional phase error; and correcting the two-dimensional phase error to generate a corrected image.

7. The computer-readable medium according to claim 6, wherein the modeling the two-dimensional phase error is solely based on azimuth or range.

8. The computer-readable medium according to claim 6, wherein the modeled two-dimensional phase error is represented as two one-dimensional vectors or two sets of parametric basic vectors.

9. The method according to claim 8, wherein a contrast metric is used to determine whether to use a model fit of the original data based on which maximizes the contrast metric.

10. The method according to claim 9, wherein the contrast metric utilizes a line-power normalization of the complex image, a column-power normalization, or both.

* * * * *